Dec. 31, 1946.   H. M. WEIR   2,413,674
MULTISTAGE METHOD OF PURIFYING STYRENE
Filed Feb. 27, 1943
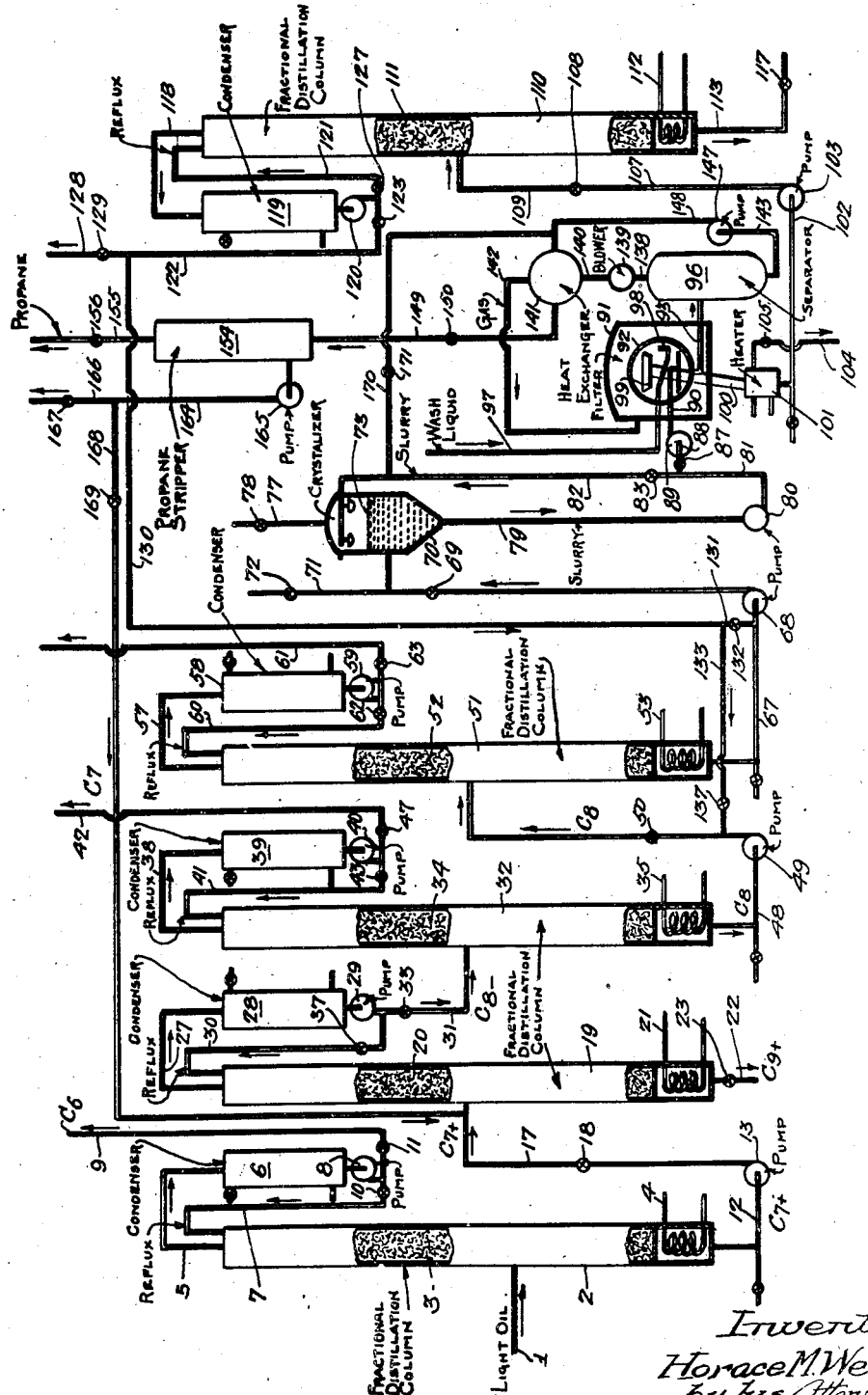
Inventor
Horace M. Weir
by his Attorney
Hugo G. Fenimor Patented Dec. 31, 1946

2,413,674

UNITED STATES PATENT OFFICE 2,413,674

MULTISTAGE METHOD OF PURIFYING STYRENE

Horace M. Weir, Wynnewood, Pa., assignor to The United Gas Improvement Company, a corporation of Pennsylvania Application February 27, 1943, Serial No. 477,365

10 Claims. (Cl. 260—669)

This invention pertains generally to the purification of valuable hydrocarbons and pertains particularly to resin-forming unsaturated hydrocarbons.

The invention pertains more particularly to the purification of crude unsaturated hydrocarbon fractions derived from light oil obtained in the manufacture of combustible gas, such for example, in a process involving the pyrolysis of petroleum oil with or without the aid of catalysts.

The invention pertains still more particularly to the purification of light oil styrene fractions for the recovery of styrene in more concentrated form, including the substantially pure form.

There are various processes for the manufacture of combustible gas, such for example, as oil gas, carburetted water gas, coal gas, etc., which yield considerable quantities of tar as well as other materials which are readily condensible from the gas. The extent to which such materials are removed from the gas is, of course, dependent upon the extent to which the gas is treated for the removal of condensate therefrom. Various tools are available for this purpose, such as refrigeration, compression, adsorption and absorption and combinations of the foregoing.

The various condensates, including the tar, comprise sources for numerous resin-forming unsaturated hydrocarbons, such as indene, methyl styrene, styrene, cyclopentadiene, isoprene, piperylene, isobutylene, butadiene, etc. Fractions of these various materials are usually separated from the various condensates by fractional distillation and are then subjected to purification methods which frequently involve concentration to a high state of purity.

Due to the fact that many of these materials are thermally unstable and are present in fractions containing relatively large quantities of materials of similar boiling point, great difficulty is experienced in attempting to concentrate many of these materials by fractional distillation alone.

This is particularly true in the case of styrene due to the presence of not only ortho-xylene, meta-xylene, and para-xylene, but also to numerous other similarly boiling materials, such as phenyl acetylene, and possibly ethyl benzene, isopropyl benzene, etc.

Thus by ordinary distillation technique, it is difficult to exceed a concentration of say 50 to 60% of styrene in a light oil fraction. By special measures and very refined technique, a concentration of say 80% styrene in a light oil fraction is sometimes a possibility. Theoretically, the production of pure styrene by distillation alone is possible, but is prohibitably expensive because although the separation of styrene from meta-xylene and from para-xylene can be more readily accomplished, the separation of styrene from ortho-xylene is extremely difficulty because of the very close proximity of the boiling points of styrene and ortho-xylene.

For resin manufacture and for other purposes, it is frequently desirable to have styrene in a substantially pure or at least a very highly concentrated form.

It has hitherto been proposed to concentrate styrene by fractional distillation to a concentration of say 50 or 60% or somewhat higher, and then to continue the purification by fractional crystallization to obtain substantially pure styrene. See copending application Serial Number 319,373, filed February 17, 1940, by Horace M. Weir, which has matured into Patent 2,383,-174 granted August 21, 1945, and application Serial Number 406,142, filed August 9, 1941, by Gerald L. Eaton.

The difficulty of producing substantially pure styrene by distillation alone will become apparent from a study of the boiling points of materials which have been identified as present in light oil styrene fractions.

(1) Styrene boils at approximately 144.9° C.
(2) Ortho-xylene boils at approximately 144.5° C.
(3) Meta - xylene boils at approximately 139.1° C.
(4) Para - xylene boils at approximately 138.44° C.
(5) Phenyl acetylene boils at approximately 142° C.

In concentrating styrene in a light oil fraction by distillation, ortho-xylene concentrates in the fraction with respect to the other xylenes since its boiling point is very close to that of styrene. Thus a light oil fraction concentrated to say 50 to 60% styrene, may contain ortho-xylene as the principal constituent other than styrene. At higher concentrations the accompanying xylene may become entirely ortho-xylene.

The prolonged heating incurred in such distillations results in large losses of styrene due to polymerization.

That styrene may be crystallized from a mixture of styrene and the three isomeric xylenes commonly found in light oil styrene fractions provided the concentration of styrene is maintained above 33 to 35% to avoid the formation of eutectic was an unexpected eventuality, among other reasons, because of the freezing points of the xylenes as compared to that of styrene.

For example, while the freezoing point of styrene is approximately −31° C., the freezing points of the isomeric xylenes are respectively as follows:

(1) Ortho-xylene, approximately −27° C.;
(2) Meta-xylene, approximately −54° C.; and
(3) Para-xylene, approximately +13.2° C.

From this data, it will be seen that the freezing points of two of the xylenes are above the freezing point of styrene.

Furthermore since the many materials present in light oil fractions are capable of forming a very large number of eutectic mixtures, the possibility of commercially separating styrene from a light oil fraction through the medium of crystallization was wholly unexpected.

From the standpoint of crystallization, it is fortunate that para-xylene which freezes 45° C. above the freezing point of styrene is reduced in concentration during the preliminary distillation. From this standpoint, however, it is unfortunate that meta-xylene which freezes at 22° C. below the freezing point of styrene and which therefore is most readily separable by freezing is also reduced in concentration during the preliminary distillation, while ortho-xylene which freezes above the freezing point of styrene is concentrated with the styrene, due to the extreme closeness of the boiling points of the two materials.

In such an extremely complicated system, it is a wholly unforseen circumstance that after a preliminary concentration of a light oil styrene fraction by distillation to a point above 33 to 35%, pure styrene crystals may be made to separate by fractional crystallization.

Such fractional crystallization may be carried to the production of substantially pure styrene.

The tenacious adherence of the mother liquor to the styrene crystals, however, is sometimes very troublesome, making it more feasible to conduct the crystallization in two stages to reduce the amount of washing required of the styrene crystals to remove mother liquor. Thus in the first stage the concentration may be carried to say 85% to 90% or 95% without excessive washing. The crystals are then melted and subjected to recrystallization for further purification in which, however, substantially greater washing is required with unavoidable solution of styrene crystals in wash liquid.

I have discovered that styrene in high concentration including substantially pure styrene may be separated from mixtures with xylenes such as in light oil in economically and in good yields by (1) effecting a preliminary concentration of styrene for example by fractional distillation or otherwise to produce a fraction having a styrene concentration above the styrene concentration in the eutectic mixture capable of being formed between styrene and the remaining components, (2) continuing the concentration by fractional crystallization to produce a fraction containing a still higher styrene concentration, (3) further continuing the concentration of styrene by another fractional distillation to produce styrene in yet higher concentration which may be that of substantially pure styrene.

For example, I may concentrate styrene contained in light oil by fractional distillation to a concentration of say from 45 to 80%; then I may carry the concentration to say 90% by the medium of fractional crystallization according to the methods described in the above copending applications or otherwise; and then I may concentrate the 90% styrene produced by fractional crystallization to a concentration of styrene of 95% or higher by fractional distillation.

I have discovered that in the concentration from say 50% styrene to 90% styrene through the medium of fractional crystallization, there is not an accompanying concentration of ortho-xylene comparative to that which would take place if the concentration from say 50% to 90% styrene were effected through the medium of distillation. Thus the 90% styrene fraction obtained by crystallization frequently contains no greater proportion of ortho-xylene relative to the other isomeric xylenes than did the 50% styrene fraction produced by the preliminary distillation. In fact it is thought that there may be a decrease in the proportion of ortho-xylene relative to the other xylenes, in some cases, due to difference in selective adsorption of the xylenes by the styrene crystals.

It will of course be understood that if by some means a starting styrene-xylene mixture is produced containing styrene in higher concentration than that of the eutectic composition without any initial concentration, the first concentrating step may be omitted. Usually, however, an initial concentrating step will be necessary.

Therefore, the final distillation step, concentrating the styrene from say 90% to substantially pure styrene, may be effected relatively inexpensively by distillation due to the aforementioned fact that the 90% concentration was reached without unduly concentrating the ortho-xylene, which is so difficult to separate by distillation.

The provision of a final distillation step to complete the concentration of the styrene very considerably reduces the cost of the crystallization step, as it is no longer necessary to wash adsorbed mother liquor from the styrene crystals as completely as otherwise would be required. In fact the final distillation step usually obviates any necessity for a second crystallization stage operating upon melted crystals from a first crystallization stage, a procedure which has been found necessary, in some cases, in order to efficiently produce substantially pure styrene when the final purification is by fractional crystallization.

It will be understood that other methods than fractional distillation may be employed in the initial concentration of the styrene to a concentration above that of the eutectic composition between styrene and the remaining constituents. As an example of such other methods, selective solvent extraction as described in Patent 2,295,612, dated Sept. 15, 1942, may be mentioned.

An alternative method of obtaining styrene of the desired concentration for the final distillation is that which comprises blending a styrene fraction of high concentration, say a concentration of 95%, such as a styrene fraction obtained by the crystallization of styrene from a liquid material containing the same, with a styrene fraction of low concentration, say 60% such as a styrene fraction obtained by the distillation of a crude styrene containing mixture.

Further features of the invention reside in the steps, combination of steps, and sequence of steps, and the construction, arrangement, and combination of parts all of which, together with other features, will become more apparent to persons skilled in the art as the specification proceeds and upon reference to the drawing in which Figure 1 is a flow sheet illustrating one form of my invention, which will be more particularly described in connection with the employment of an internal refrigerant in the crystallization stage of the process and with filtering as the method of separating styrene crystals and mother liquor in that stage.

Referring to Figure 1, 1 indicates a line supplying light oil to the fractional distillation column 2 which is illustrated as provided with packing 3. Any desired phase contacting means may be employed in this or other columns in the apparatus, such for example, as conventional rings, saddles, balls, jack chain, etc., or columns of other types, such for example as bubble plate columns may be employed instead of packed columns. 4 indicates a heating coil, such as steam coil, for example for supplying heat to the base of the column.

Column 2 may be operated so that the light oil is fractionated for example, into material of predominately six carbon atoms and lower which is taken off as overhead through line 5 to condenser 6. A part of the resulting condensate may be returned to the column 2 by the pump 8 through line 7 as reflux and a part may be lead off as product through the line 9 as controlled by the valves 10 and 11.

Material of predominately seven carbon atoms and higher, for example, may be lead off from the bottom of the column through line 12 and supplied by pump 13 through line 17 controlled by valve 18 to the fractional distillation column 19.

Column 19 is illustrated as provided with phase contacting means 20 and heating coil 21.

Column 19 may be operated, for example, in a manner such that material of predominately nine carbon atoms and higher is lead off as bottoms from column 19 through line 22 controlled by valve 23.

Material of predominately eight carbon atoms and lower may be lead as overhead from column 19 through line 27 to condenser 28. A part of the resulting condensate may be returned to the column by pump 29 through line 30 and a part lead by way of line 31 to fractional distillation column 32 as controlled by valves 33 and 37.

The fractional distillation column 32 may be provided with phase contacting means 34 and heater 35.

Column 32 may be operated for example in a manner such that material of predominately seven carbon atoms is taken off from column 32 as overhead by way of line 38 to condenser 39. A part of the resulting condensate may be returned by pump 40 and line 41 to column 32 as reflux, the remainder of the condensate being lead off as product, through line 42, as controlled by valves 43 and 47.

Material of predominately eight carbon atoms comprising, for example, approximately 65% xylene and 35% styrene may be lead off as bottoms from column 32 by way of line 48 and supplied by pump 49 through valve 50 to fractional distillation column 51.

Fractional distillation column 51 may be provided with phase contacting means 52 and the heating coil 53.

Column 51 may be operated for example so that material comprising chiefly xylene is lead off as overhead through line 57 to condenser 58.

A part of the resulting condensate may be supplied by pump 59 through line 60 to column 51 as reflux, the remainder being lead away by line 61 as controlled by valves 62 and 63.

From the bottom of fractional distillation column 51, a styrene fraction may be lead off as bottoms containing from say 45 to 80% styrene depending upon the degree of fractionation effected in fractional distillation column 51. This material is lead off by way of line 67 and supplied by pump 68 through valve 69 to the crystallizer 70 in admixture with an internal refrigerant, for example, a liquefied normally gaseous hydrocarbon refrigerant, such as propane, supplied through line 71 controlled by valve 72.

In the operation of the fractional distillation columns, it will be understood that suitable reflux ratios may be employed, the precise reflux ratios depending upon other factors as will be readily understood by those skilled in the art. Also the various fractionations may be performed under any desired pressure. Sub-atmospheric pressures, produced by means not shown but readily understood by those skilled in the art, are especially advantageous in minimizing polymerization during distillation. Also diluent gases may be employed if desired to reduce the partial pressures of constituents of the mixtures being fractionated.

Returning to the crystallizer, crystallizer 70 is maintained at a suitable fluid level illustrated for convenience at 73.

The crystallizer 70 may be maintained at any pressure suitable for the evaporation of sufficient propane to obtain the desired low temperature in the fluid mass therein, for the purpose of crystallizing styrene to form a slurry of styrene crystals and mother liquor. Propane vapors are removed through line 77 as controlled by valve 78, through which the desired pressure in crystallizer 70 may be conveniently controlled. Any suitable pressure regulating mechanism may be employed for this purpose. For example, line 78 may lead to the inlet of a compressor unit not shown.

Sub-atmospheric pressure is usually employed in order to obtain a copious crop of styrene crystals in crystallizer 70, care, however, is exercised to restrict the cooling sufficiently to avoid solidification of eutectic mixture.

The slurry formed in crystallizer 70 is continuously removed from the crystallizer by means of line 79 and pump 80, which circulates the slurry preferably at a fairly high rate through lines 81 and 82 back to crystallizer 70. This circulation of slurry assists in maintaining a fairly uniform temperature in the fluid mixture in the crystallizer 70 and also provides for agitation of the slurry in the crystallizer. Agitation of the slurry in the crystallizer is desirable in order to avoid or reduce the growing of crystal masses on the walls of the crystallizer.

A part of the circulating slurry is withdrawn as controlled by the valves 83 and 87 through line 88, pump 89, line 90 to the filter 91, having an inner revolving cylindrically shaped filter bed 92.

Filter 91 may, of course, be of any suitable construction and type, the rotating type of filter being particularly convenient, because among other reasons, its operation is continuous in character.

There are two general types of rotating filters which may be employed, one receiving the crystals to be filtered out on the outside surface and the other receiving said crystals on the inside surface. The filter 91, as illustrated, is of the latter type and line 90 has been illustrated as depositing the slurry on the inside of the cylindrical filter bed 92.

It will, of course, be understood that filter 91 has a casing which is substantially gas tight, and that the filter and crystallizer, as well as necessary accessory apparatus and connections, are provided with suitable heat insulation in order to maintain the desired low temperatures therein.

The operation of filters of the type particularly described is well known in the art and further description may be dispensed with except in so far as the filter enters into the invention.

In the operation of filter 91, filtrate is forced through the filter bed and is forced off through line 93 to tank 96.

Washing liquid, for example liquid wash propane, is introduced through line 97 and is sprayed across the face of the filter cake as it rises out of the pool of slurry in the bottom of the rotating filter bed 92.

Conveniently, this wash liquid may be sprayed uniformly through nozzle 98 against the filter cake.

In the filter illustrated, gas pressure forces the wash propane as well as the filtrate through the filter cake and into line 93 previously referred to.

At the low temperatures at which it is frequently preferred to maintain the filtration zone during the filtration step, the vapor pressure of propane is relatively low. Hence it is frequently desirable when using differential gas pressure for filtration purposes to employ a supplemental gas, which is preferably an inert gas such as nitrogen, to increase the total pressure during the filtration step and thereby maintain the bulk of the wash propane in the liquid phase.

When the filter cake has been washed to a desired extent, it is removed from the filter bed and is collected in trough 99 by means not shown but well known in the construction of filters, and the cake may be withdrawn from the filter through means such as line 100 to heater 101 in which the cake is melted and in which any residual propane accompanying the styrene crystals may be stripped therefrom and lead off through line 104 and valve 105.

In the practice of the present invention, the crystallization step including the washing of the crystals is carried out in a manner such that the concentration of the styrene produced therein falls short of substantially pure styrene and, which for example, may be between approximately 85% and 95% and preferably in the neighborhood of 90%.

The melted filter cake is passed by way of line 102, pump 103, line 107, valve 108 and line 109 to the fractional distillation column 110.

This column may also be provided with any desired phase contacting means, such as for example, packing indicated at 111. The column is provided with heating means, such for example, as the heating coil 112.

In column 110, a further concentration of the styrene is effected, the column may be operated in a manner such that styrene of any desired degree of purity may be drawn off as bottoms through line 113 provided with valve 117. For example, the styrene so drawn off may be the substantially pure form which for the purposes of this invention is considered to be of a purity of 95% or higher. If desired however, styrene of a lower degree of purity than 95% may be drawn off through line 113.

The overhead material taken off from column 110 through line 118 is passed to condenser 119. This material will be relatively rich in xylene as compared with the bottoms from the columns. A part of the resulting condensate may be returned by pump 120 by way of line 121 to the column 110 as reflux. Another portion may be drawn off through line 122 as controlled by valves 123 and 127. Any reflux ratio suitable for the separation desired may be employed. The particular reflux ratio employed, will depend, among other things, upon the number of theoretical plates in the column and upon the desired degree of separation. With a column of 44 theoretical plates and a desired degree of purity of 95% or greater in the styrene lead off as bottoms therefrom, and with material of approximately 90% styrene fed thereto, a reflux ratio of approximately 20 to 1 has been found convenient.

The relatively xylene rich overhead material not refluxed to column 110, may be drawn off for any desired disposal through line 128 and valve 129, or may be recycled through line 130 to an upstream portion of the purification system. For example, this material may be recycled to the lines leading to crystallizer 70 by way of line 131 and valve 132, or may be recycled to the line leading to fractional distillation column 51 by way of line 133 and valve 137. The particular point in the system to which the xylene rich material from column 110 is recycled, will depend upon the proportions of xylene and styrene therein, which, of course, will depend upon the operation of column 110.

Returning to the crystallizing portion of the system, the gas employed for forcing filtrate and wash liquid through the filter bed may also pass through line 93 to tank 96 in which it may be separated from the mother liquor also passing thereto, and may be drawn off through line 138, blower 139 and line 140 to heat exchanger 141 and thence through line 142 back to the filter 91. The blower 139 applies a pressure drop across the filter bed in filter 91.

The manner in which the gas enters the filter and is distributed therein is dependent upon the filter construction and suitable types of equipment for individual use are well known in the art.

Filtrate is removed from tank 96 through line 143, pump 147 and line 148 to and through heat exchanger 141 in which it is brought into heat exchange relationship with the gas flowing from blower 139 through lines 140 and 142 thereby cooling said gas.

If desired, additional heat exchangers may be inserted in the gas flow to further reduce the temperature of the circulating gas as desired.

After passage of the mother liquor through heat exchanger 141, this liquid mixture, which is rich in xylene but contains a concentration of styrene above that of the eutectic mixture, for example say 40% styrene, is lead off through line 149 and valve 150 to the propane stripper 154. Propane is lead off from the stripper through line 155 and valve 156 and may be reliquefied for reuse as refrigerant or wash liquid. The propane freed mother liquor is lead off from the stripper through line 164 by pump 165 and may pass by line 166 and valve 167 to any desired disposal, or may be recycled, if desired, to an upstream portion of the purification.

The precise point to which this material is recycled will depend among other things upon its composition. For example, it may be convenient to recycle this material as through line 168 and valve 169 to line 17 leading to fractional distillation column 19, inasmuch as this material may contain a small quantity of material of nine carbon atoms and higher which may be separated in tower 19.

If desired, a portion of this material may be recycled through line 170 and valve 171 to the crystallizer 70.

As an example of the operation of my invention, the following may be given:

Example

A light oil obtained in the manufacture of combustible gas may be distilled under reduced pressure and under conditions such that pot temperatures do not exceed say 110° C. to obtain a light oil styrene fraction having a styrene concentration of say approximately 60%

This 60% material is mixed with say somewhat more than an equal part by weight of propane and introduced into a crystallizer such as that illustrated at 70 in the accompanying drawing. The crystallizer may be maintained at temperatures of the order of say about −75° C. or −80° C. by the evaporation of a portion of the propane content of the mixture.

In this manner, by the evaporation of propane, a cold slurry containing styrene crystals is produced. This slurry is introduced into a filter such as 91 and the crystallized styrene removed from the slurry. Propane may be introduced into the filter for washing the crystalline styrene on the filter bed.

The styrene recovered from the filter is introduced into a propane recovery system where propane, adhering thereto is separated.

The styrene recovered, and depending upon the degree of washing, may be of say about 90% purity.

This 90% styrene is placed in a still pot provided with a packed column having an efficiency of say 45 theoretical plates. A polymerization inhibitor such as hydroquinone is preferably added. The distillation is carried out at a reflux ratio of say about 10:1. Upon completion of the distillation, styrene of approximately 95% concentration will be obtained.

From the foregoing, it will be understood that the invention may comprise a three stage purification comprising a fractional distillation (or a solvent extraction) stage, followed by a fractional crystallization stage, followed by a second fractional distillation stage, and that the fractional crystallization stage may be reached by blending material from a first distillation stage with fairly concentrated material from a previous crystallization stage.

It will also be understood that in its broader aspects, the invention is not limited to the employment of any particular method of or means for fractional distillation or crystallization in the respective stages and that, therefore, the specific means illustrated in the accompanying drawing and described above are to be regarded as illustrative.

Such features as the number of cuts taken in the fractional distillations, the number of columns employed, the reflux ratios employed, the general design and arrangement and operation of the fractional distillation columns, may be varied widely.

Either continuous or batch operations may be employed in any of the various stages.

An internal refrigerant may be employed as described in the above copending applications, Serial Number 319,373 and Serial Number 406,142, or the crystallization may take place in the absence of an internal refrigerant as described in Serial Number 315,631, or otherwise.

The concentrations of styrene given for illustration at various points in the purification system may be varied widely except of course as to the eutectic point. Although possibly the invention finds its most useful employment in connection with the production of substantially pure styrene, it may well have advantages in the production of styrene of lower degrees of purity.

Broadly summarizing: this invention relates to the purification of hydrocarbons, such as styrene; and it comprises concentrating, advantageously by fractional distillation, a liquid material containing styrene and other material of similar boiling point, such as xylene, for example light oil material containing styrene and xylene, to partially concentrate the liquid material in respect to styrene, advantageously to such a concentration that the styrene is present in a concentration higher than the concentration of styrene in the eutectic composition capable of being formed between the styrene and the combined remaining constituents of the partially concentrated liquid material, further concentrating the liquid mixture by fractional crystallization, advantageously to a styrene concentration of about 90% and thereafter further concentrating the thus concentrated liquid material by fractional distillation; all as more fully hereinabove set forth and as claimed.

Therefore, while I have particularly described certain procedure and equipment and have given particular examples, it is to be understood that this is by way of illustration and that changes, omissions, additions, substitutions and/or modifications may be made within the scope of the claims without departing from the spirit of the invention.

I claim:

1. A method of purifying styrene contained in a mixture with xylenes including ortho xylene, which comprises concentrating styrene in said mixture by fractionation other than fractional crystallization to produce a fraction richer in styrene than any eutectic composition capable of being formed between styrene and other constituents of said fraction; subjecting said fraction to fractional crystallization by cooling to produce a mass comprised of styrene crystals and liquid phase material, said liquid phase material being richer in xylene than said fraction and richer in styrene than any said eutectic composition; separating liquid phase material from said mass to leave a remaining mass containing xylene but richer in styrene than said fraction; and fractionally distilling said remaining mass to further concentrate styrene therein.

2. A method of purifying styrene contained in a mixture with xylenes including ortho xylene, which comprises fractionally distilling said mixture to produce a fraction richer in styrene than any eutectic composition capable of being formed between styrene and other constituents of said fraction; subjecting said fraction to fractional crystallization by cooling to produce a mass comprised of styrene crystals and liquid phase material, said liquid phase material being richer in xylene than said fraction and richer in styrene than any said eutectic composition; separating liquid phase material from said mass to leave a remaining mass richer in styrene than said fraction but containing xylene; and fractionally distilling said remaining mass to further concentrate styrene therein.

3. A method of purifying styrene contained in a mixture with xylenes including ortho xylene, which comprises fractionally distilling said mixture to produce a fraction richer in styrene than any eutectic composition capable of being formed between styrene and other constituents of said fraction; subjecting said fraction to fractional crystallization to produce a mass comprised of styrene crystals and liquid phase material, said liquid phase material being richer in xylene than said fraction and richer in styrene than any said eutectic composition; separating liquid phase material containing xylene from said mass by filtration followed by washing of said crystals to leave a remaining mass richer in styrene than said fraction but containing xylene; and fractionally distilling said remaining mass to further concentrate styrene therein.

4. In a multi-stage method of purifying styrene contained in a mixture with xylenes including ortho xylene, which comprises a stage comprising fractionally distilling said mixture to produce a fraction richer in styrene than any eutectic composition capable of being formed between styrene and other constituents of said fraction; a stage comprising subjecting said fraction to fractional crystallization to produce a mass comprised of styrene crystals and liquid phase material, said liquid phase material being richer in xylene than said fraction and richer in styrene than any said eutectic composition, and separating liquid phase material from said mass to leave a remaining mass richer in styrene than said fraction but containing xylene; and a stage comprising fractionally distilling said remaining mass to produce a fraction in which styrene is further concentrated and a fraction in which xylene is concentrated; the step of recycling at least a portion of said last named fraction to said first mentioned fractional distillation stage for admixture with the material undergoing fractionation therein.

5. In a multi-stage method of purifying styrene contained in a mixture with xylenes including ortho xylene, which comprises a stage comprising fractionally distilling said mixture to produce a fraction richer in styrene than any eutectic composition capable of being formed between styrene and other constituents of said fraction; a stage comprising subjecting said fraction to fractional crystallization to produce a mass comprised of styrene crystals and liquid phase material, said liquid phase material being richer in xylene than said fraction and richer in styrene than any said eutectic composition, and separating liquid phase material from said mass to leave a remaining mass containing xylene but richer in styrene than said fraction; and a stage comprising fractionally distilling said remaining mass to produce a fraction in which styrene is further concentrated and a fraction in which xylene is concentrated; the step of recycling at least a portion of said last named fraction to said fractional crystallization stage for admixture with the material undergoing fractionation therein.

6. A method of purifying styrene contained in light oil material produced in the manufacture of combustible gas by a process involving the pyrolysis of petroleum oil, said light oil containing styrene and also containing xylenes including ortho xylene, which comprises fractionally distilling said light oil material to produce a fraction containing between 45 and 80% styrene; subjecting said fraction to fractional crystallization by cooling to produce a mass comprised of styrene crystals and liquid phase material, said liquid phase material being richer in xylene than said fraction and richer in styrene than any eutectic composition capable of being formed between styrene and other constituents of said fraction; separating liquid phase material from said mass to leave a remaining mass containing xylene but richer in styrene than said fraction; raising the temperature of said remaining mass to melt said crystals; and fractionally distilling said remaining mass to further concentrate styrene therein.

7. A method of purifying styrene contained in light oil material containing styrene and also containing xylenes including ortho xylene, which comprises fractionally distilling said light oil material to produce a light oil fraction containing between approximately 45 and 80% styrene; subjecting said fraction to fractional crystallization by cooling to produce a mass comprised of styrene crystals and liquid phase material, said liquid phase material being richer in xylene than said fraction and richer in styrene than any eutectic composition capable of being formed between styrene and other constituents of said fraction; separating liquid phase material from said mass to leave a remaining mass containing xylene but containing between 85 and 95% styrene, raising the temperature of said remaining mass to melt said crystals; and fractionally distilling said remaining mass to produce a fraction containing more than 95% styrene.

8. A method of purifying styrene contained in light oil material also containing xylenes including ortho xylene, which comprises fractionally distilling said light oil material to produce a fraction containing between 45 and 80% styrene; subjecting said fraction to fractional crystallization to produce a mass comprised of styrene crystals and liquid phase material, said liquid phase material being richer in xylene than said fraction and richer in styrene than any eutectic composition capable of being formed between styrene and other constituents of said fraction; separating liquid phase material from said mass to leave a remaining mass containing xylene but richer in styrene than said fraction; melting said crystals in said remaining mass; and fractionally distilling said remaining mass to concentrate styrene therein to at least 98%.

9. A method of purifying styrene contained in a light oil material also containing xylenes including ortho xylene, which comprises fractionally distilling said light oil material to produce a fraction richer in styrene than any eutectic composition capable of being formed between styrene and other constituents of said fraction; admixing said fraction with a liquefied normally gaseous refrigerant; subjecting said fraction to fractional crystallization by cooling caused by evaporation of said refrigerant to produce a mass comprised of styrene crystals and liquid phase material, said liquid phase material being richer in xylene than said fraction and richer in styrene than any said eutectic composition; separating liquid phase material from said mass to leave a remaining mass containing xylene but richer in styrene than said fraction; and fractionally distilling said remaining mass to further concentrate styrene therein.

10. A method of purifying styrene contained in a light oil material also containing xylenes including ortho xylene, which comprises fractionally distilling said light oil material to produce a fraction richer in styrene than any eutectic composition capable of being formed between styrene and other constituents of said fraction; admixing said fraction with liquefied propane; subjecting said fraction to fractional crystallization by cooling caused by evaporation of said propane to produce a mass comprised of styrene crystals and liquid phase material, said liquid phase material being richer in xylene than said fraction and richer in styrene than any said eutectic composition; separating liquid phase material from said mass to leave a remaining mass containing xylene but richer in styrene than said fraction; and fractionally distilling said remaining mass to further concentrate styrene therein.

HORACE M. WEIR.